Aug. 24, 1954 W. M. WEBSTER, JR 2,687,487
MULTIANODE GAS DISCHARGE DEVICE
Filed Oct. 21, 1952 4 Sheets-Sheet 1

INVENTOR.
William M. Webster, Jr.
BY William A. Zaluck
ATTORNEY

Aug. 24, 1954 W. M. WEBSTER, JR 2,687,487
MULTIANODE GAS DISCHARGE DEVICE
Filed Oct. 21, 1952 4 Sheets-Sheet 2

INVENTOR.
William M. Webster, Jr.
BY William A. Zaleak
ATTORNEY

Aug. 24, 1954
W. M. WEBSTER, JR
2,687,487
MULTIANODE GAS DISCHARGE DEVICE
Filed Oct. 21, 1952
4 Sheets-Sheet 3
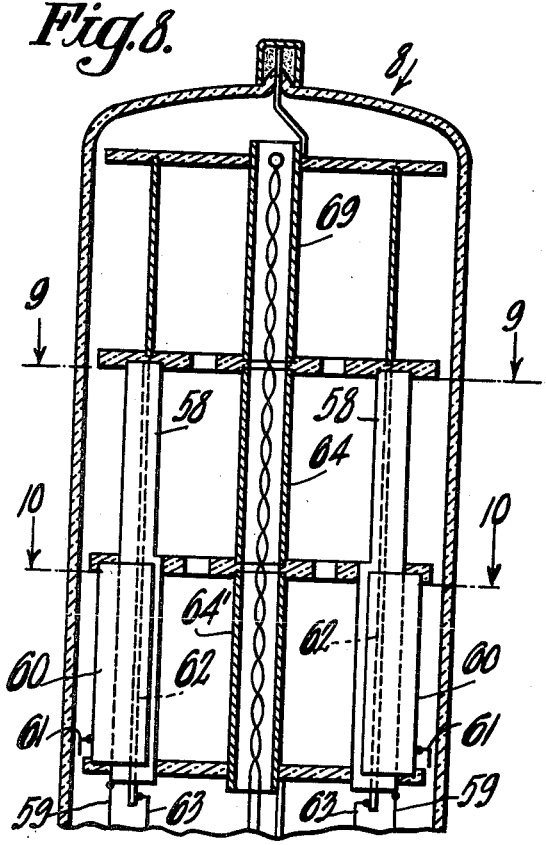
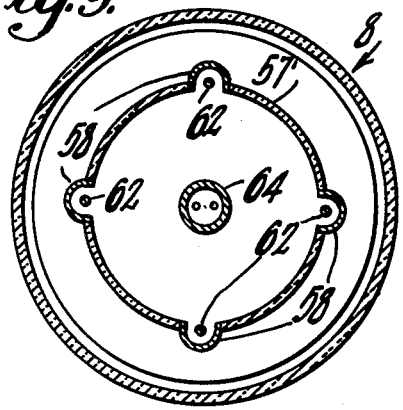
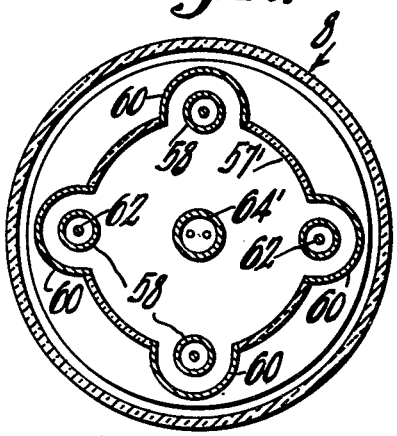
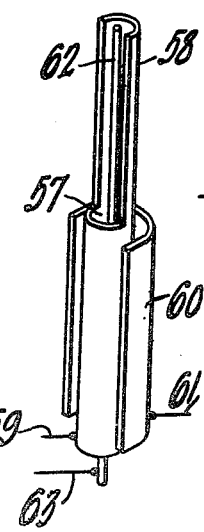
INVENTOR.
William M. Webster, Jr.
BY William A. Zabcock
ATTORNEY Aug. 24, 1954
W. M. WEBSTER, JR
2,687,487
MULTIANODE GAS DISCHARGE DEVICE
Filed Oct. 21, 1952
4 Sheets-Sheet 4
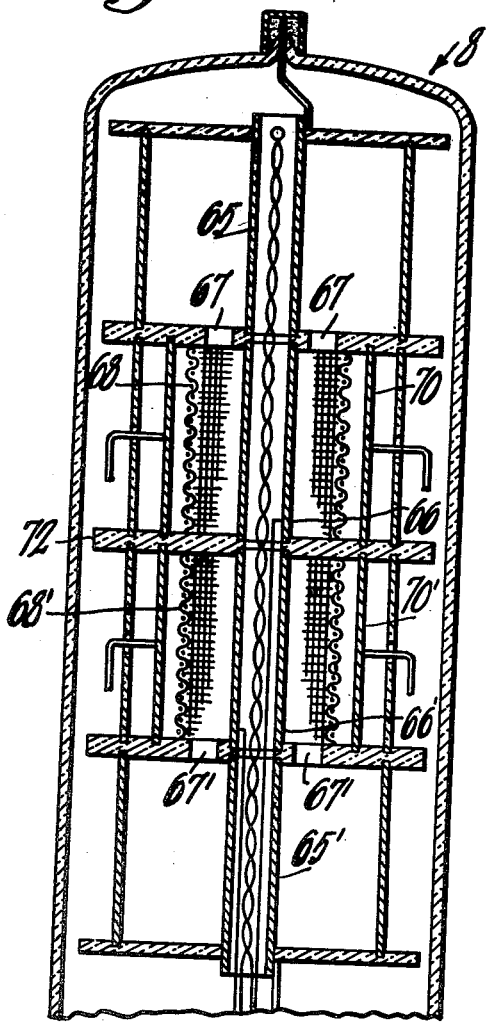
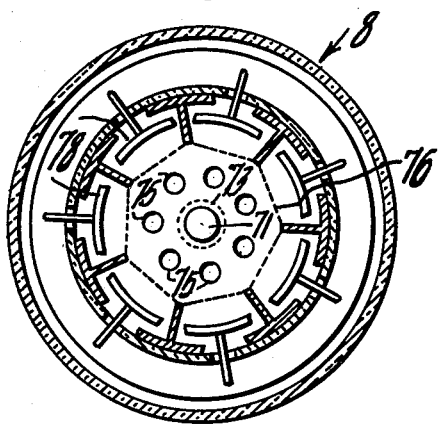
INVENTOR.
William M. Webster, Jr.
BY William A. Zaleske
ATTORNEY Patented Aug. 24, 1954

2,687,487

UNITED STATES PATENT OFFICE 2,687,487

MULTIANODE GAS DISCHARGE DEVICE

William M. Webster, Jr., Princeton, N. J., assignor to Radio Corporation of America, a corporation of Delaware Application October 21, 1952, Serial No. 315,876

18 Claims. (Cl. 313—193)

This invention relates to improvements in gas discharge devices that are to be used as counter or switching tubes. In particular this invention relates to improvements in gas discharge devices, or tubes, of a particular kind having very high values of transconductance and of anode currents, with low values of output impedance.

In the various vacuum types of discharge devices that have been used as counter tubes, switching tubes, or for similar purposes, the well known space charge effects are present which cause the devices to have a high impedance. Due to the space charge effect it is desirable to utilize an ionizable medium in the devices to overcome this high impedance. Gas discharge devices heretofore in use are not capable of as fast a switching or counting action as is often desired, nor have the prior devices offered the great advantage of continuous grid control.

A further limitation upon the prior devices, that are used in counter circuits, is the limitation that only a certain number may be used without supplying additional voltage sources to energize the various electrodes in the devices. This limitation is an economical limitation which limits the practical number of counter tubes that may be used in a given circuit.

It is therefore an object of this invention to provide a new and improved gaseous discharge device that is adapted to be used as a counter or switching type of device.

It is a further object of this invention to provide a new and improved gas discharge device wherein the output current may be rapidly switched from one output electrode to another or may be switched to a plurality of output electrodes at the same instant.

It is a still further object of this invention to provide a new and novel multiple section gas discharge device that will be able to count to any number of counts.

It is a still further object of this invention to provide a new and novel stacked arrangement of a multiple section counter, or switching, type of gas discharge device.

It is a still further object of this invention to provide a new and novel composite multiple section gas discharge device of the binary counter type.

It is a still further object of this invention to provide a new and improved switching tube that is a very composite structure and one that eliminates certain connections outside the envelope.

These, and other objects, are attained in accordance with the general aspect of this invention by providing a gas discharge device comprising an auxiliary discharge path functioning in conjunction with a plurality of main current paths within the tube. The auxiliary discharge path normally consists of an auxiliary cathode so energized as to provide a conductive plasma for the main paths. The plurality of main current paths may comprise a main cathode operating in conjunction with a plurality of anodes which may or may not operate in conjunction with a plurality of control electrodes. If the plurality of control electrodes is desired they may be so energized as to continuously control the output current to the plurality of anodes either singularly or in combination.

This invention provides a new and novel stacked arrangement which will facilitate the use of any number of main paths thus any number of counts, etc., may be utilized.

The above mentioned features and advantages, as well as many others, will be understood by referring to the following descriptions of the illustrated embodiments when read in connection with the accompanying four sheets of drawings wherein like reference characters designate similar parts throughout the several views and in which:

Figure 8 is a fragmentary transverse sectional view of a further embodiment of this invention wherein the anodes of one main region are utilized as the control electrodes of an adjacent main region;

Figure 9 is a sectional view taken along line 9—9 of Figure 8;

Figure 10 is a sectional view taken along line 10—10 of Figure 8;

Figure 11 is a perspective view on an enlarged scale showing the anodes and control electrodes in an adjacent pair of main regions for the embodiment shown in Figure 8;

Figure 12 is a fragmentary sectional view of a further modification of the stacked arrangements that this invention contemplates;

Figure 13 is a fragmentary transverse sectional view of a still further embodiment of this invention with the envelope removed for convenience.

Figure 1:
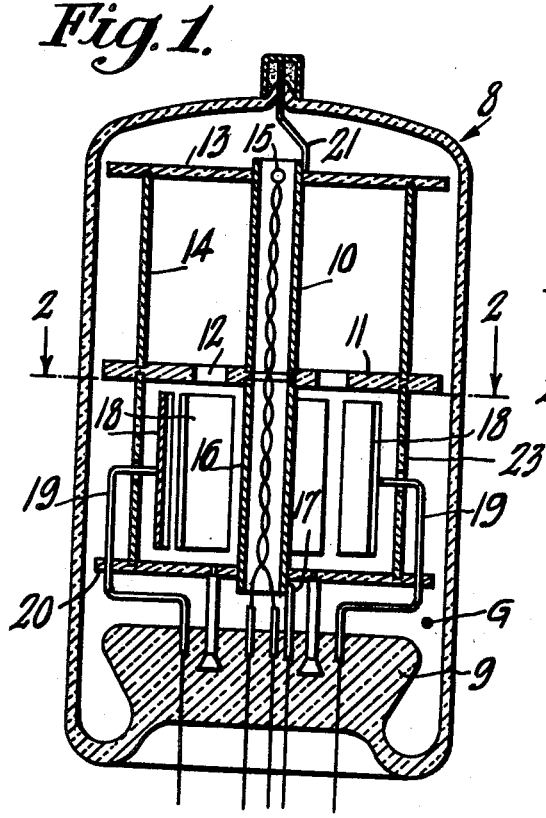
Figure 1 is a transverse section of the gas discharge device constructed in accordance with this invention; the section is taken along the line 1—1 of Figure 2.
Figure 2:
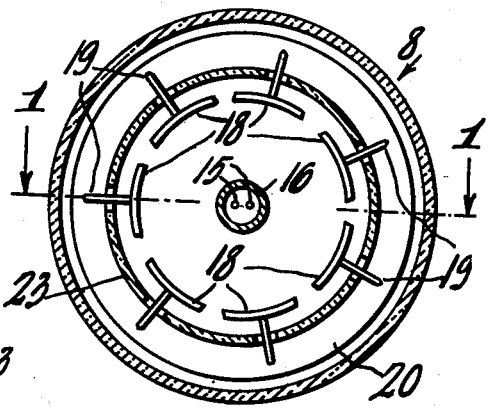
Figure 2 is a sectional view of the gas discharge device shown in Figure 1 with the section taken along the line 2—2 of Figure 1.

Referring now to Figures 1 and 2 there is shown a gas discharge device comprising an envelope 8 containing ionizable medium G. Any suitable ionizable medium may be utilized such as a gas or a metal vapor filling. The pressure for any particular embodiment will be in accordance with its specific electrode geometry and spacings but is not at all critical and may be varied over wide ranges. A number of tubes of the type under consideration have been found to operate very satisfactorily with a filling of helium at a pressure of approximately 750 microns. However, as is well known, other ionizable mediums, and other pressures may be used, e. g., pressures that lie within the range of approximately 100 microns to several millimeters of mercury.

The electrode assembly includes two general groups or sets of electrodes which are the electrodes for (1) ionizing the medium contained within the tube and (2) the electrodes included within the load or work circuits.

The ionizing electrode group includes an auxiliary cathode 10, which may be of the conventional oxide coated, indirectly heated type; an apertured member 11 having therein apertures 12; an auxiliary cathode shielding member 14, which surrounds the auxiliary cathode 10; and an end insulating member 13. The region enclosed by the above mentioned elements will hereinafter be referred to as an auxiliary region.

The main or load current electrode group includes a main cathode 16, which also may be of the conventional oxide coated, indirectly heated type; and a plurality of main anodes 18. The energy for heating both the auxiliary cathode 10 and the main cathode 16 is obtained from a common filament 15. Supporting the entire structure is a bottom insulating member 20, which, in turn is supported in a conventional manner by support rods, as shown, upon stem 9. The main cathode 16 may be suitably energized by lead-in 17. Each of the plurality of anodes 18 has an individual lead-in connection 19. Surrounding the anodes and intermediate the apertured member 11 and the bottom insulating member 20 is an insulating member 23. The auxiliary cathode 10 may be suitably energized by lead-in connection 21. The main current electrodes and the enclosing insulating members will hereinafter be referred to as a main region.

In operation of my new and improved switching, or counting type of tube the auxiliary cathode 10 is so energized that it will supply a copious supply of electrons to the main region. The entire main region is so energized that it will attract electrons from the auxiliary cathode 10, i. e. each of the electrodes in the main region is positive with respect to the auxiliary cathode 10. Thus the electrons from the more negatively biased auxiliary cathode 10 will be attracted to the main region by the main cathode 16, and the plurality of anodes 18.

When the main region is made sufficiently positive with respect to the auxiliary cathode an auxiliary discharge will occur, through apertures 12, to the main region and this discharge will ionize the gaseous filling of the tube. When the gaseous filling is ionized a conductive plasma will be formed. The plasma, and the general operation of this type of gas discharge device are more completely explained in a copending application of Edward O. Johnson, Serial Number 185,745 filed September 20, 1950 and assigned to the same assignee as the present invention. As is pointed out in this copending application, the plasma is an extremely low impedance conductor of electrons. The conductive plasma will fill the main region, i. e. the space existing between main cathode 16, and the plurality of main anodes 18, thus forming a low impedance conductor between these electrodes.

When it is desired to have an individual anode 18 conduct a potential that is positive with respect to the main cathode 16 is applied to the anode that is to conduct. If it is desired to have a plurailty of anodes 18 conduct a potential that is positive with respect to the main cathode 16 is applied to the desired plurality of main anodes.

The reason that any individual anode 18 may be made conductive while other anodes 18 do not conduct is due to the nature of the plasma that is generated by the auxiliary discharge. This phenomenon occurs because the motion of the charge particle within a plasma is largely random in nature and if a suitable potential is applied to the electrodes, there is then superimposed upon the random motion, a drift motion. It is this drift motion of the charged particles that constitutes the electron current.

Due to the fact that this drift motion within the plasma may be rapidly changed in direction the output current may be changed from one anode to another, or any number of anodes may be made conductive at any given instant. Due to the random motion of the charged particles in the plasma no appreciable current will flow to any electrode unless the drift motion is superimposed upon the random motion. It is because of this drift motion that while one anode is conducting, the adjacent pair of anodes will not conduct, and thus any desired number of anodes 22 may be made conductive by superimposing a drift motion upon the normal random motion of the charged particles. Since the electrons move at a much greater velocity than the positive ions the drift motion will be predominantly an electron current.

Figure 3:
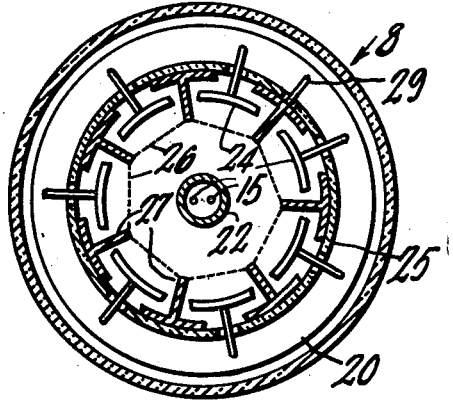
Figure 3 is a sectional view of an embodiment of a gas discharge device made in accordance with this invention.

Figure 3 is a cross-sectional view of an embodiment of this invention wherein there is interposed between a main cathode 22, and each of a plurality of anodes 24, a control electrode 26. The control electrode 26 is supported by means of the control electrode shielding members 27 which are in turn supported by the insulating member 25. The control electrode 26 may be constructed like any conventional control electrode, i. e., rods or mesh type. The size of the foramina in the control electrode structure is preferably large enough to permit the plasma that is generated by the auxiliary discharge to readily diffuse through the control electrode to the separate anodes. Foramina of approximately 2 mm. in cross-section will be adequate for this purpose. However, this invention contemplates foramina both larger and smaller than 2 mm.

The apertures that are arranged between the auxiliary region (not shown) and the main region open into the space between the main cathode 22 and the control electrode 26 in this embodiment. The control electrode 26 is energized by the lead-in 29 in the usual manner.

In operation of this embodiment of my invention the control electrode 26 may have applied thereto a voltage which will control the flow of electron current to any of the anodes 24. This control may be in magnitude of the electron current as well as simple on-off control. However, since only one control electrode 26 is used the control applied to the flow of current to one of the plurality of anodes 24 must be applied to all of the plurality of anodes.

Figure 4:
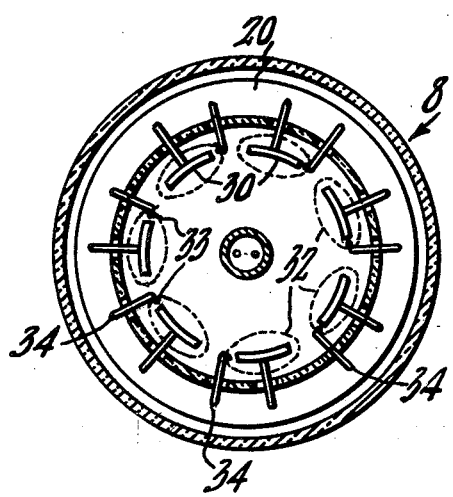
Figure 4 is a fragmentary sectional view, of a further embodiment of this invention utilizing individual control electrodes for each anode.

Figure 4 is a further embodiment of this invention wherein each of the anodes 30 has surrounding it an individual control electrode 32. Each of the control electrodes 32 are supported by support rods 33 in the usual manner. The control electrodes 32 may be individually energized by means of the separate lead-in connections 34. Due to these separate lead-in connections, and the individual control electrodes, the plurality of anodes 30 may be made conductive at various voltage magnitudes and/or at various times so that any switching or counting type of action may be easily arranged. In this embodiment any particular magnitude of current output may be obtained from any of the plurality of anodes 30.

Figure 5:
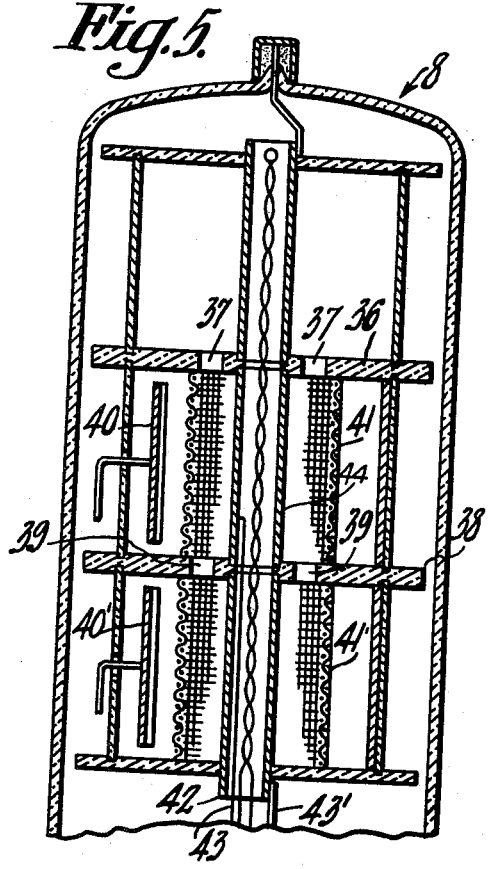
Figure 5 is a fragmentary transverse sectional view of a modification of this invention having a plurality of main regions.

Figure 5 is a stacked arrangement containing one auxiliary region and a plurality of main regions. This stacked arrangement may be used with any of the embodiments shown in Figures 1 through 4. As in Figure 1 there is an apertured member 36 having apertures 37 therein separating the auxiliary region from the adjacent main region. The auxiliary region is not described in detail as it is similar to that shown in the other embodiments. Separating each of the main regions is an apertured member 38 having apertures 39 therein. Any number of main regions may be utilized depending upon the number of counts or switching actions that are desired. As is shown, and for simplicity of illustration, each main region contains only one anode 40 and 40' however any number of anodes within the practical considerations of construction of the device may be placed in a main region and are within the contemplation of this invention. Each main region contains a control electrode 41 and 41', or each anode 40 and 40' may utilize a separate control electrode (not shown) as in Figure 4.

The operation of the device shown in Figure 5 will be the same as that shown in any of the above mentioned figures except for the fact that the additional main region will have a definite relationship with respect to the next adjacent main region closer to the auxiliary region. The main region that is nearest to the auxiliary region is operated as an auxiliary region with respect to the next more remote auxiliary region etc. The voltage applied to main cathode 42, by means of lead-in 43', is positive with respect to the main cathode 44 in order that the two will function properly. Voltage is applied to main cathode 44 by means of lead-in 43. In other words, as an example of the operating potentials assume the auxiliary cathode is being operated at −100 volts, the main cathode adjacent the auxiliary region at 0 volts, the next more remote main cathode, with respect to the auxiliary region at 100 volts positive, the next 200 volts positive etc.

Any additional number of main regions may be connected on to the stacked arrangement by having additional apertured members 38 interposed between the main regions and by operating the device in such a manner that each successive main region functions as an auxiliary region with respect to the next main region in the direction away from the auxiliary region.

Figure 6:
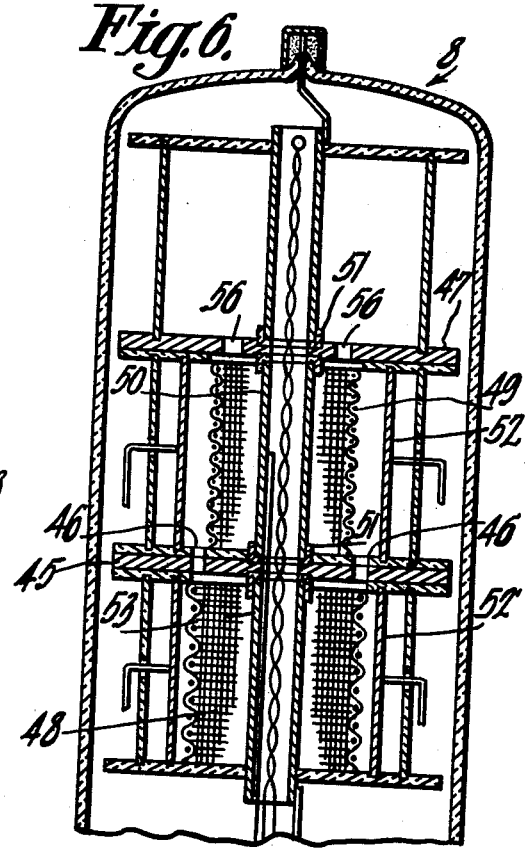
Figure 6 is a fragmentary sectional view of a further modification of this invention wherein one main region will modulate the plasma density of an adjacent main region.

Figure 6 is a stacked arrangement wherein the plasma density of a more remote main region, with respect to the auxiliary region, is modulated by the main region adjacent to the auxiliary region. This is possible due to the fact that the apertured member 45 has located therein apertures 46 which open from the anode side of control electrode 49 into the space between the control electrode 48 and the main cathode 53. Thus the plasma that enters the next more remote region is modulated by the control electrode, or electrodes 49.

The type of an arrangement described and shown in Figure 6 may be desired when a particular event is desired to instigate a further chain of events. By means of this arrangement each of the control electrodes 49 may control the flow of current to any of the anodes 52 as well as the plasma density in a more remote main region. Thus as one of the main paths in the main region adjacent the auxiliary region is made conductive then the plasma will extend into the more remote main region and due to this plasma the main paths in the more remote main region may be made conductive.

In Figure 6 the apertured members 45 and 47 are conductive members. In some instances it may be desired to apply a voltage to these apertured members to modulate the plasma density that will enter into the next adjacent region. By means of these conductive apertured members 45 and 47 the plasma entering the adjacent main region may be controlled if the proper negative potential is applied to the apertured electrodes. When using the conductive apertured electrodes some type of insulating material 51 is interposed between the main cathodes 50 and 53 and the apertured electrodes 45 and 47, respectively. If a potential that is negative with respect to the plasma is applied to the apertured electrodes 45 and 47, the effective area of the apertures 46 and 56 is reduced and the plasma entering the next main region is thus modulated. Here again the auxiliary region is not described as it is similar to that already described in detail.

Figure 7:
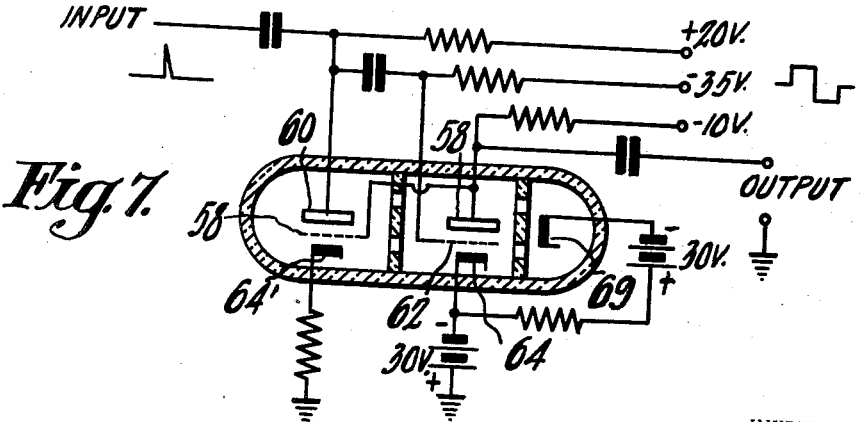
Figure 7 is a circuit diagram of a conventional multivibrator circuit when adapted for use with the types of tubes under consideration in this invention.

Figure 7 is a circuit diagram of a conventional pulsed multivibrator circuit that is adapted for use with a tube structure as shown in Figure 8. The tube is shown schematically and only 1 section of the group of electrodes is shown. The various circuit elements that are shown are not described for the reason that various values may be assigned to these elements depending upon the operating characteristics desired. The voltage values shown are not intended to be limiting but are merely given as a mode of operation. The right section of the device as shown will conduct when the tube is energized. When a pulse is applied to the input circuit the left section will conduct and the right section will be cut off. When the next pulse is applied the reverse occurs, etc. The feature of the circuit diagram that should be noted is that a control electrode 58 is connected to an anode 58 on the inside of the envelope. A connection between the control electrode of one stage and the anode of the next stage is used in many of the conventional multivibrator circuits such as this.

Figures 8, 9, and 10 are views of an embodiment of this invention, while Figure 11 is an enlargement of one section of this embodiment that is especially adapted for use in a circuit similar to that shown in Figure 7 and wherein a stacked arrangement similar to the one shown in Figure 5 is utilized. The auxiliary region comprises auxiliary cathode 69. The first main region next adjacent the auxiliary region comprises main cathode 64; individual control electrodes 62 are rod-shaped electrodes, each of which is partially surrounded by an individual anode 58. The individual anodes are supported by insulating material 57'. Anodes 58 extend from the first main region into a second main region where they function as the control electrodes for the second main region. In the second main region comprising main cathodes 64', the electrodes 58 are in turn partially surrounded by individual anodes 60. The individual anodes 60 are supported intermediate insulating material 57'. A four section tube is illustrated which is appropriate for a count of ten. A count of one thousand is obtained by utilizing ten sections. The relationship between the control electrodes and the anodes may be more clearly understood by referring to Figure 11.

As shown in Figure 11 the control electrode 62 is energized by the lead-in 63; while electrode 58 is energized by the lead-in 59; and the anode 60 is energized by the lead-in 61. Telescoped arrangement of the unitary control electrodes and anodes may be continued until any desired number is reached. In order to hold the control electrode rod 62 in spaced relationship with respect to anode 58 the area between these is filled with insulating material 57 as shown.

Figure 12 is a stacked arrangement wherein each of the main regions operates in conjunction with a separate auxiliary region. The top auxiliary region and the top main region, and the bottom auxiliary region and bottom main region, are the same as has been described, and will function as described in connection with Figure 5. The auxiliary cathode 65 supplies the conductive plasma to the top main region through apertures 67. The main cathode 66 functions in conjunction with the control electrodes 68 and the anodes 70 as has been previously described in connection with the main region of Figure 5 that is adjacent the auxiliary region. The main regions are separated by the insulating member 72. The bottom main region and the bottom auxiliary region will function as the top main and auxiliary regions and elements have numbers that are primed to designate equivalent elements in the bottom two regions.

One advantage of this type of arrangement is that the plasma density for the different main regions may be more accurately controlled. Another advantage is that while there may be a certain amount of coupling between adjacent main regions in the embodiments that have been described hereinabove such coupling is prevented by utilizing the embodiment shown in Figure 12. It should be understood that the main regions may be alternated with the auxiliary regions, also any number of the main and auxiliary regions may be utilized. The structure as shown in Figure 1 for the main regions may also be utilized in this stacked arrangement.

Figure 13 is an embodiment of this invention wherein the auxiliary cathode 71 is surrounded by an apertured electrode 73, a plurality of main cathodes 75 which operate in conjunction with control electrode 76, and a plurality of anodes 78. The apertured electrode 73 functions as described in connection with the apertured electrode 45 (Figure 6). This concentric arrangement offers a more composite structure and may also be stacked if a larger number of counts is required. In place of control electrode 76, individual control electrodes with separate lead-ins may be provided as shown in connection with the embodiment illustrated in Figure 4. If desired the control electrode may be omitted as in Figure 1. A still further modification of this embodiment consists of an arrangement utilizing one main cathode for a pair, or more, of anodes depending upon the type of operation desired.

I claim:

1. A gas discharge device comprising, a sealed envelope having an ionizable medium therein, a plurality of spaced groups of electrodes in said envelope, a plurality of apertured elements in said envelope and one intermediate each of said groups, each of said groups and the adjacent apertured element defining a main region in said envelope there being a main region for each envelope there being a main region for each group, each of said groups including a thermionic cathode and a plurality of spaced apart anodes, said regions communicating with one another through said apertures, electrode means adjacent one of said regions for ionizing said medium and producing a plasma in each of said regions, and an apertured element intermediate said electrode means and said adjacent one of said regions with the apertures opening into said region.

2. A gas discharge device as in claim 1 further comprising control electrode means interposed between said thermionic cathode and said anodes in each of said main regions.

3. A gas discharge device as in claim 1 further comprising a plurality of control electrodes one for each of said anodes and supported in operative spaced relationship with each of said anodes in each of said main regions.

4. A gas discharge device comprising, a sealed envelope containing an ionizable medium, means for producing a plasma including a thermionic cathode and an apertured element within said envelope, at least one group of electrodes in said envelope comprising a main thermionic cathode and a plurality of spaced apart anodes, said group of electrodes arranged adjacent the apertures in said apertured element, said means and said group of electrodes communicating one with the other through said apertures, and said plasma normally extending from adjacent said main cathode to adjacent said anodes.

5. A gas discharge device as in claim 4 wherein said apertured element is a conductive element.

6. A gas discharge device as in claim 4 further comprising at least one control electrode interposed between said main cathode and said anodes.

7. A gas discharge device comprising, a sealed envelope containing an ionizable medium, means for producing a plasma including a thermionic cathode and an apertured element within said envelope, a plurality of groups of electrodes within said envelope, each of said groups comprising a main thermionic cathode and a control electrode means and a plurality of spaced apart anodes all arranged in operative spaced relationship, one of said groups being adjacent said apertured element, a plurality of apertured elements one intermediate each of the remaining of said groups, said groups and said first mentioned means communicating with each other through the apertures in said apertured elements.

8. A gas discharge device comprising, an envelope having an ionizable medium therein, an auxiliary thermionic cathode, a hollow member surrounding said auxiliary cathode, an apertured member abutting one end of said auxiliary cathode and said hollow member, a plurality of spaced groups of electrodes, a plurality of apertured elements in said envelope one intermediate each of said groups, each of said groups and the adjacent apertured element defining a main discharge region in said envelope there being a main discharge region for each group, each of said groups including a main cathode and a plurality of control electrodes and a plurality of spaced apart anodes arranged in operative spaced relationship, said regions communicating one with the other and with said auxiliary cathode through said apertures, the apertures in all of said apertured elements opening into the space existing between said main cathode and said control electrodes of adjacent groups and each of said cathodes being heated by a single filament.

9. A gas discharge device comprising, a sealed envelope having an ionizable medium therein, a pair of spaced apart groups of electrodes, an apertured element intermediate said groups and the adjacent apertured element defining a main region there being a main region for each of said groups, each of said groups including a thermionic cathode and a plurality of spaced apart control electrodes and a plurality of spaced apart anodes arranged in operative spaced relationship, one of said control electrodes being operatively associated with each of said anodes, electrode means adjacent one of said regions for ionizing said medium and producing a plasma in said regions, and an apertured member intermediate said electrode means and said adjacent one of said regions, the apertures in said apertured element opening from the space existing between said control electrodes and said anodes in said one of said regions into the space existing between said thermionic cathode and said control electrodes in the other of said regions.

10. A gas discharge device comprising a sealed envelope having an ionizable medium therein, a means for producing a plasma, a first group of electrodes comprising a thermionic cathode and a plurality of control electrodes and a plurality of anodes, a second group of electrodes comprising a second thermionic cathode and a second plurality of control electrodes and a second plurality of anodes, an apertured element interposed between said means and said first group of electrodes having apertures therein that open into the space existing between said first thermionic cathode and said first plurality of control electrodes, an apertured element interposed between said first group of electrodes and said second group of electrodes having apertures that open from the space existing between said first plurality of control electrodes and said first plurality of anodes in said first group of electrodes into the space existing between said second thermionic cathode and said second plurality of control electrodes in said second group of electrodes and said groups and said means communicating with each other through said apertures.

11. A gas discharge device as in claim 10 wherein said apertured elements are conductive elements.

12. A gas discharge device comprising, a sealed envelope containing an ionizable medium, a plurality of spaced groups of electrodes, each of said groups including a thermionic cathode and a plurality of spaced apart control electrodes and a plurality of spaced apart anodes, one of said control electrodes being associated with each of said anodes, means adjacent at least one of said groups for producing a plasma, plasma modulating means intermediate each of said groups and intermediate said first mentioned means and said one of said group, said groups and said first mentioned means communicating one with the other through said second mentioned means.

13. A gas discharge device comprising, a sealed envelope containing an ionizable medium, a first group of electrodes including a first thermionic cathode and a first plurality of control electrodes, a second group of electrodes including a second thermionic cathode and a second plurality of anodes, a plurality of unitary anodes and control electrodes with the anode portion being spaced in operative relationship with said first plurality of control electrodes in said first group and said control electrode portion being spaced in operative relationship with said second plurality of anodes in said second group, and means for producing a plasma.

14. A gas discharge device comprising, a sealed envelope containing an ionizable medium, a pair of spaced groups of electrodes, the first of said groups including thermionic cathode and a plurality of spaced apart control electrodes and a plurality of spaced apart anodes, one of said control electrodes being operatively associated with each of said anodes, the other of said groups including a thermionic cathode and a plurality of spaced apart anodes, said plurality of anodes in said first group extending into said second group and operatively arranged as control electrodes in said second group, means for producing a plasma including an auxiliary thermionic cathode arranged adjacent said first group, an apertured element intermediate said means and said first group, an apertured element intermediate said first group and said second group, said groups and said means communicating one with the other through said apertures, and said plasma normally extending from said cathode to said anodes in both of said groups.

15. A gas discharge device, comprising a sealed envelope containing an ionizable medium, a first and second spaced apart group of electrodes each comprising a thermionic cathode and a plurality of spaced apart control electrodes and a plurality of spaced apart anodes, an apertured element intermediate said first and said second groups, an auxiliary thermionic cathode adjacent one of said groups of electrodes, an apertured element intermediate said auxiliary cathode and said one of said groups, each of said control electrodes of said first group being rod shaped, each of said anodes of said first group being partially cut away hollow tubular shaped and partially surrounding an associated control electrode, said control electrodes and each of said associated anodes of said first group extending in a telescoped manner into said second group wherein each of said rod shaped control electrodes are completely surrounded by said associated hollow tubular shaped anode, each of said associated hollow tubular anodes of said first group functioning as a control electrode in said second group and being partially surrounded by an associated partially cut away hollow tubular shaped anode of said second group.

16. A gas discharge device comprising, an envelope containing an ionizable medium, a plurality of groups of electrodes each including a thermionic cathode and a plurality of spaced apart control electrodes and a plurality of spaced apart anodes, a means for producing a plasma, each of said groups having a separate plasma producing means arranged adjacent thereto, an apertured element interposed between each of said means and said adjacent group, said plasma extending from adjacent said cathode to adjacent all of said anodes in each of said groups, said means and its associated group communicating one with the other through said apertures.

17. A gas discharge device, comprising a sealed envelope containing an ionizable medium, a pair of spaced groups of electrodes each including a thermionic cathode and a plurality of spaced apart control electrodes and a plurality of spaced apart anodes, an insulating element intermediate said groups for preventing electron flow therebetween, a pair of plasma producing means each including an auxiliary thermionic cathode and each adjacent one of said groups, an apertured element intermediate said means and associated group, said group and said means communicating through said apertures, and all of said cathodes being heated by a single filament.

18. A gas discharge device, comprising a sealed envelope having an ionizable medium therein, an auxiliary thermionic cathode, an apertured electrode surrounding said auxiliary cathode, a plurality of spaced apart anodes arranged in spaced concentric array around said apertured electrode, a plurality of spaced apart main thermionic cathodes spaced intermediate said apertured electrode and said anodes, and control electrode means spaced intermediate said main thermionic cathodes and said anodes.

References Cited in the file of this patent

UNITED STATES PATENTS

| Number | Name | Date |
|---|---|---|
| 2,565,103 | Toulon | Aug. 21, 1951 |